(12) United States Patent
Hirukawa et al.

(10) Patent No.: US 11,094,920 B2
(45) Date of Patent: Aug. 17, 2021

(54) APPARATUS AND METHOD FOR MANUFACTURING BELT-LIKE ELECTRODE

(71) Applicant: TOYOTA JIDOSHA KABUSHIKI KAISHA, Toyota (JP)

(72) Inventors: Tomofumi Hirukawa, Miyoshi (JP); Keisuke Takano, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 290 days.

(21) Appl. No.: 16/166,263

(22) Filed: Oct. 22, 2018

(65) Prior Publication Data

US 2019/0131614 A1 May 2, 2019

(30) Foreign Application Priority Data

Oct. 31, 2017 (JP) .............................. JP2017-211237

(51) Int. Cl.
*H01M 4/04* (2006.01)
*H01M 4/139* (2010.01)
*H01M 4/02* (2006.01)

(52) U.S. Cl.
CPC ....... *H01M 4/0435* (2013.01); *H01M 4/0404* (2013.01); *H01M 4/139* (2013.01); *H01M 2004/025* (2013.01)

(58) Field of Classification Search
CPC combination set(s) only.
See application file for complete search history.

(56) References Cited

U.S. PATENT DOCUMENTS

| | | | |
|---|---|---|---|
| 5,242,361 A * | 9/1993 | Brown | B21B 27/055 492/10 |
| 10,553,852 B2 * | 2/2020 | Fukunaga | H01M 4/623 |
| 2013/0074711 A1 * | 3/2013 | Uematsu | B30B 3/005 100/35 |
| 2013/0326865 A1 | 12/2013 | Kobayashi et al. | |
| 2019/0131614 A1 * | 5/2019 | Hirukawa | H01M 4/0404 |

FOREIGN PATENT DOCUMENTS

JP 2014-116141 A 6/2014
JP 5596183 B2 9/2014

* cited by examiner

*Primary Examiner* — Minh N Trinh
(74) *Attorney, Agent, or Firm* — Sughrue Mion, PLLC

(57) ABSTRACT

An apparatus for manufacturing a belt-like electrode including: a pair of press rolls configured to press a belt-like current collector foil with an electrode mixture layer along a longitudinal direction in a thickness direction of the electrode mixture layer; and a stretching roll configured to stretch a non-forming part which is the current collector foil without the electrode mixture layer in respective ends in a width direction is provided. The stretching roll includes: a first roll opposed to the electrode mixture layer formed in the current collector foil; and a pair of second rolls arranged in respective ends of the first roll in an axial direction and opposed to the non-forming part, and a central axis of the first roll is deviated with respect to a central axis of the pair of second rolls in a direction away from the stretched current collector foil.

3 Claims, 9 Drawing Sheets

APPARATUS AND METHOD FOR MANUFACTURING BELT-LIKE ELECTRODE

CROSS REFERENCE TO RELATED APPLICATIONS

This application is based upon and claims the benefit of priority from Japanese patent application No. 2017-211237, filed on Oct. 31, 2017, the disclosure of which is incorporated herein in its entirety by reference.

BACKGROUND

The present disclosure relates to an apparatus for manufacturing a belt-like electrode and a method for manufacturing the same.

A belt-like electrode used for, for example, a lithium-ion secondary battery or the like has a structure in which an electrode mixture layer is formed on a surface of a belt-like current collector foil along a longitudinal direction. The current collector foil include a forming part in which the electrode mixture layer is formed and a non-forming part in which the current collector foil is exposed in respective ends of the current collector foil in the width direction.

In an apparatus for manufacturing the aforementioned belt-like electrode and a method for manufacturing the same, as disclosed in Japanese Unexamined Patent Application Publication No. 2014-116141, the current collector foil in which the electrode mixture layer is formed is pressed in a thickness direction. Due to this pressing process, the electrode mixture layer is compressed and the electrode density of the belt-like electrode to be manufactured can be improved.

In the aforementioned pressing process, however, the forming part of the current collector foil in which the electrode mixture layer is formed is stretched, whereas the non-forming part of the current collector foil is not stretched. If no measure is taken concerning this problem, the current collector foil ends up being curved. In order to avoid this problem, after the aforementioned pressing process, a process of stretching the non-forming part needs to be performed. The apparatus for manufacturing the belt-like electrode and the method for manufacturing the same disclosed in Japanese Unexamined Patent Application Publication No. 2014-116141 stretches the non-forming part using a stretching roll including a small-diameter part that is opposed to the electrode mixture layer formed in the forming part and a large-diameter part that is opposed to the non-forming part.

SUMMARY

The inventors have found the following problem regarding the apparatus for manufacturing the belt-like electrode and the method for manufacturing the same for stretching the non-forming part of the current collector foil in which the electrode mixture layer is not formed after pressing the current collector foil in which the electrode mixture layer is formed.

When the non-forming part is stretched using the stretching roll disclosed in Japanese Unexamined Patent Application Publication No. 2014-116141, a problem that wrinkles are generated in the vicinity of the boundary between the non-forming part of the current collector foil and the forming part of the current collector foil occurs. It is possible that the current collector foil may be broken due to the wrinkles generated in the non-forming part, that is, the current collector foil.

When the press amount of the forming part is increased in order to improve the electrode density, the stretch amount of the non-forming part needs to be increased as well in accordance with the increase in the press amount of the forming part. As described above, when the stretch amount of the non-forming part increases, wrinkles tend to be generated easily in the non-forming part.

The present disclosure has been made in view of the aforementioned circumstances and provides an apparatus for manufacturing a belt-like electrode and a method for manufacturing the same capable of preventing wrinkles from occurring in the non-forming part when the non-forming part of the current collector foil in which the electrode mixture layer is not formed is stretched.

An apparatus for manufacturing a belt-like electrode according to one aspect of the present disclosure is an apparatus for manufacturing a belt-like electrode including:

a pair of press rolls configured to press a belt-like current collector foil in which an electrode mixture layer is formed along a longitudinal direction in a thickness direction of the electrode mixture layer; and a stretching roll configured to stretch a non-forming part in which the electrode mixture layer is not formed and the current collector foil is exposed in respective ends of the current collector foil in a width direction, in which the stretching roll includes:
a first roll that is opposed to the electrode mixture layer formed in the current collector foil; and
a pair of second rolls arranged in respective ends of the first roll in an axial direction, the pair of second rolls being opposed to the non-forming part, and
a central axis of the first roll is deviated with respect to a central axis of the pair of second rolls in a direction away from the current collector foil that is stretched.

In the apparatus for manufacturing the belt-like electrode according to one aspect of the present disclosure, the stretching roll that stretches the non-forming part includes the first roll that is opposed to the electrode mixture layer formed in the current collector foil and the pair of second rolls that are arranged in the respective ends of the first roll in the axial direction, the pair of second rolls being opposed to the non-forming part, and the central axis of the first roll is deviated with respect to the central axis of the pair of second rolls in the direction away from the current collector foil that is stretched. Accordingly, when the current collector foil enters the stretching roll, the recessed step of the first roll with respect to the pair of second rolls becomes gradually larger. At the same time, when the current collector foil separates from the stretching roll, the recessed step becomes gradually smaller. As a result, since the non-forming part is gradually stretched, it is possible to prevent wrinkles from occurring in the non-forming part.

The stretching roll may further include: a first shaft that forms a rotation axis of the first roll; and a pair of second shafts that form the rotation axis of the pair of second rolls, and at least one of the pair of second shafts may have a cylindrical shape and the first shaft may be inserted into the one of the pair of second shafts. It is therefore possible to deviate the central axis of the first roll from the central axis of the pair of second rolls by a simple structure.

Further, the first roll may have a hollow structure. It is therefore possible to reduce the weight of the first roll.

A method for manufacturing a belt-like electrode according to one aspect of the present disclosure is a method for manufacturing a belt-like electrode including the processes of:

pressing a belt-like current collector foil in which an electrode mixture layer is formed along a longitudinal direction in a thickness direction of the electrode mixture layer; and stretching, by a stretching roll, a non-forming part in which the electrode mixture layer is not formed and the current collector foil is exposed in respective ends of the current collector foil in a width direction, in which the stretching roll includes:
a first roll that is opposed to the electrode mixture layer formed in the current collector foil; and
a pair of second rolls arranged in respective ends of the first roll in an axial direction, the pair of second rolls being opposed to the non-forming part, and
a central axis of the first roll is deviated with respect to a central axis of the pair of second rolls in a direction away from the current collector foil that is stretched.

In the apparatus for manufacturing the belt-like electrode according to one aspect of the present disclosure, the stretching roll that stretches the non-forming part includes the first roll that is opposed to the electrode mixture layer formed in the current collector foil and the pair of second rolls that are arranged in the respective ends of the first roll in the axial direction, the pair of second rolls being opposed to the non-forming part, and the central axis of the first roll is deviated with respect to the central axis of the pair of second rolls in the direction away from the current collector foil that is stretched. Accordingly, when the current collector foil enters the stretching roll, the recessed step of the first roll with respect to the pair of second rolls becomes gradually larger. At the same time, when the current collector foil separates from the stretching roll, the recessed step becomes gradually smaller. As a result, since the non-forming part is gradually stretched, it is possible to prevent wrinkles from occurring in the non-forming part.

According to the present disclosure, it is possible to provide an apparatus for manufacturing a belt-like electrode and a method for manufacturing the same capable of preventing wrinkles from occurring in the non-forming part when the non-forming part of the current collector foil in which the electrode mixture layer is not formed is stretched.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, a specific embodiment to which the present disclosure is applied will be explained in detail. However, the present disclosure is not limited to the following embodiment. Further, for the sake of clarity of the description, the following description and the drawings are simplified as appropriate.

First Embodiment

<Structure of Belt-Like Electrode>

Figure 1:
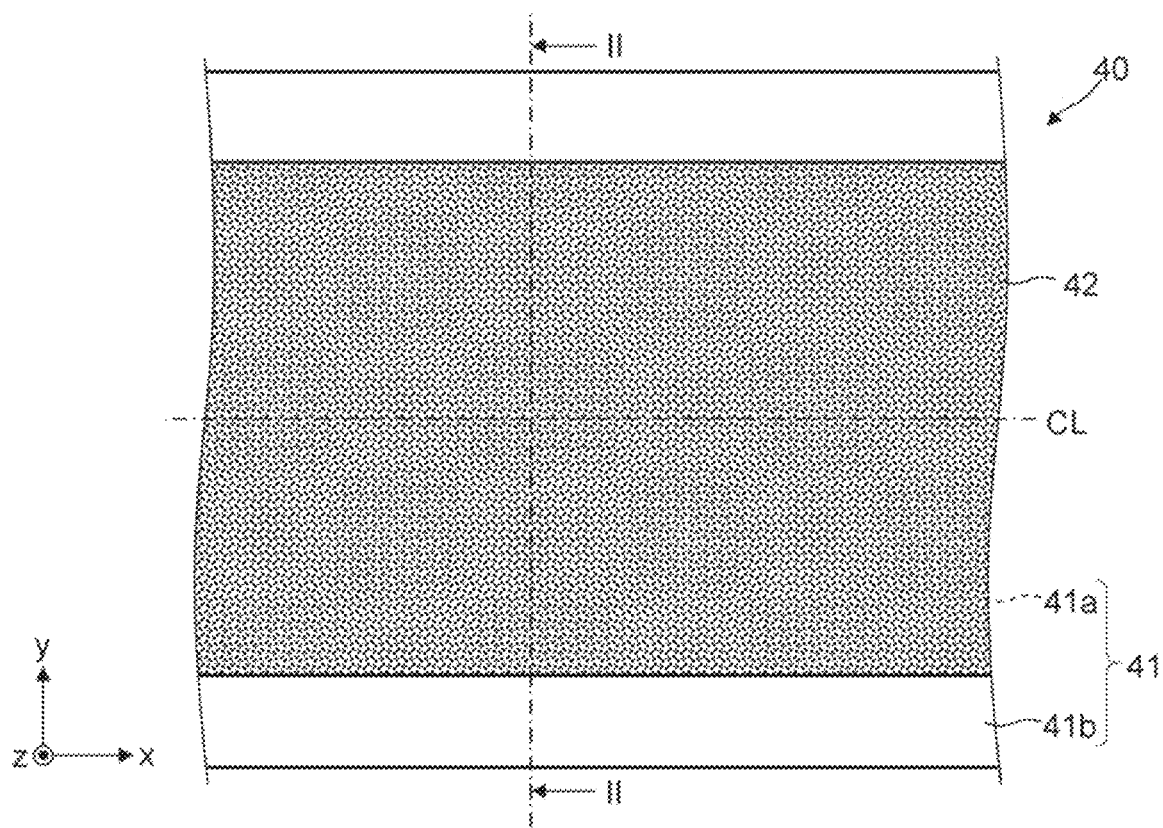
FIG. 1 is a plan view of a belt-like electrode 40.
Figure 2:
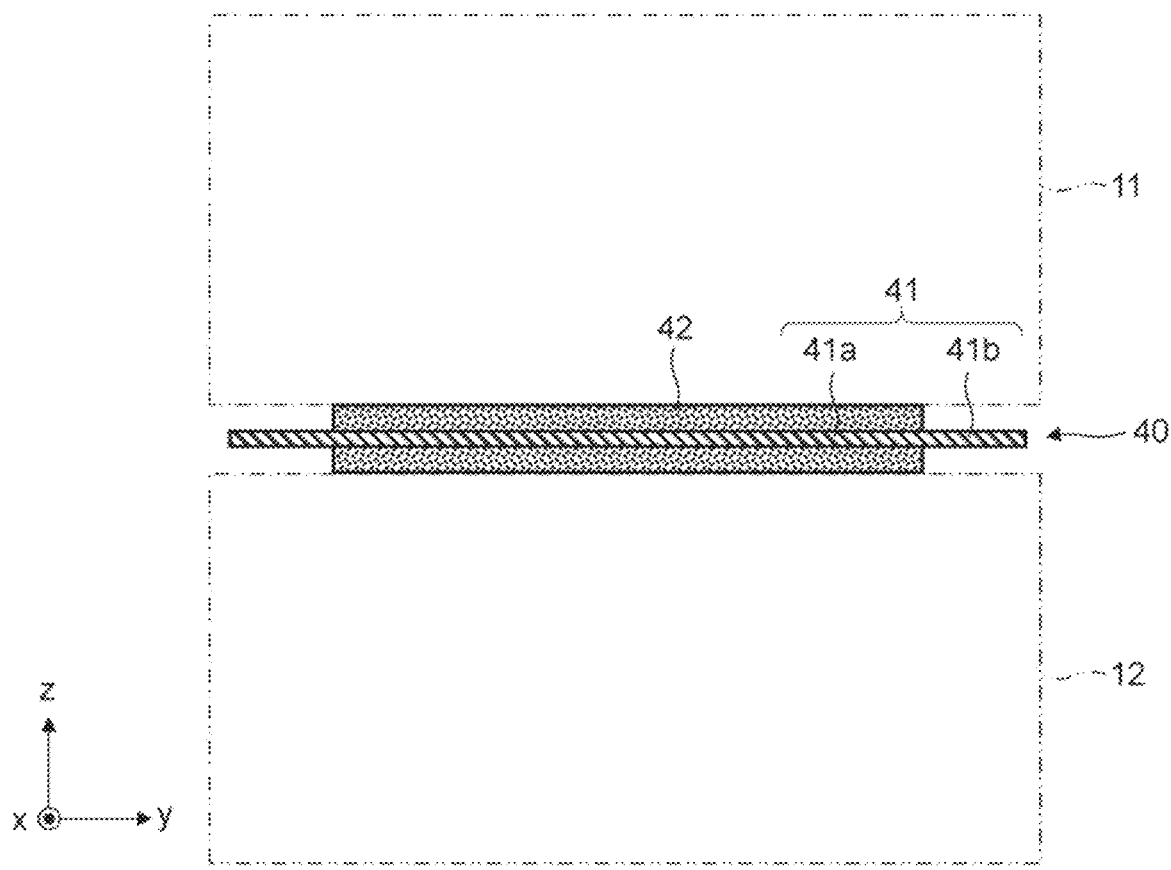
FIG. 2 is a cross-sectional view taken along the line II-II of FIG. 1.

Referring first to FIGS. 1 and 2, a structure of a belt-like electrode manufactured by an apparatus for manufacturing the belt-like electrode according to a first embodiment will be explained. FIG. 1 is a plan view of a belt-like electrode 40. FIG. 2 is a cross-sectional view taken along the line II-II of FIG. 1 and is also a cross-sectional view taken along the line II-II of FIG. 3, which will be explained later.

As a matter of course, the right-handed xyz rectangular coordinates shown in FIGS. 1, 2, and the other drawings are merely convenient ones for explaining the positional relation of the components. Typically, the z-axis positive direction is a vertically upward direction and the xy plane is a horizontal plane, which are common throughout the drawings.

The belt-like electrode 40 is, for example, a belt-like electrode for a positive electrode or a negative electrode used for a lithium-ion secondary battery and the like. As shown in FIGS. 1 and 2, the belt-like electrode 40 includes a current collector foil 41 and an electrode mixture layer 42. The current collector foil 41 includes a forming part 41a in which the electrode mixture layer 42 is formed and a non-forming part 41b in which the electrode mixture layer 42 is not formed and the current collector foil 41 is exposed in the respective ends of the current collector foil 41 in the width direction (y-axis direction). As shown in FIG. 2, the electrode mixture layer 42 is formed on the respective surfaces of the current collector foil 41. The electrode mixture layer 42 may instead be formed on one surface of the current collector foil 41.

As shown in FIG. 1, the electrode mixture layer 42 is formed in a belt shape on a surface of the current collector foil 41 along the longitudinal direction (x-axis direction) of the belt-like current collector foil 41. On the other hand, in the respective ends of the current collector foil 41 in the width direction (y-axis direction), the current collector foil 41 is exposed in a belt shape along the longitudinal direction (x-axis direction). Therefore, the current collector foil 41 is formed of the forming part 41a that is extended in a belt shape in the longitudinal direction (x-axis direction) so as to correspond to the electrode mixture layer 42 and the pair of non-forming parts 41b that are extended substantially in parallel to each other via the forming part 41a. That is, the belt-like electrode 40 has a line-symmetric structure with respect to a center line CL. As one example, the width of the forming part 41a is about 210 mm, and the width of each of the pair of non-forming parts 41b is about 15 mm.

The belt-like electrode 40 is cut along the center line CL and is divided into two pieces in a later process, although it is not shown in FIG. 1. After that, four sheets, that is, the belt-like electrode for the negative electrode obtained as a result of the division, a separator, the belt-like electrode for the positive electrode obtained as a result of the division, and a separator are laminated in this order and the laminated sheets are wound, whereby a wound electrode body is manufactured. In the wound electrode body, a positive electrode terminal is bonded to the non-forming part 41b of the belt-like electrode for the positive electrode and a negative electrode terminal is bonded to the non-forming part 41b of the belt-like electrode for the negative electrode. As one example, a porous film having a three-layer laminated structure of polyethylene (PE)/polypropylene (PP)/polyethylene (PE) may be, for example, used for the separators.

A case in which the belt-like electrode 40 is for the positive electrode will be explained. The current collector foil 41 may be, for example, an aluminum foil. The positive electrode active material that forms the electrode mixture layer 42 may be, for example, lithium-containing complex oxide such as $LiCoO_2$, $LiMnO_2$, $LiMn_2O_4$, $LiNiO_2$, $LiNi_xCo_{(1-x)}O_2$, and $LiNi_xCo_yMn_{1-x-y}O_2$ (where $0<x<1$ and $0<y<1$). The composition of the electrode material for the positive electrode active material layer is not particularly limited and a known composition can be applied thereto.

The electrode mixture layer 42 may include, for example, besides the aforementioned positive electrode active material, a conductive material such as a carbon powder and a binding agent such as polyvinylidene fluoride (PVdF) as solid contents. Furthermore, a dispersing agent such as carboxymethylcellulose Na salt (CMC) may be included as the solid content as necessary. Solvent that composes the electrode mixture layer 42 may be, for example, water, N-methyl-2-pyrrolidone (NMP) or the like.

A case in which the belt-like electrode 40 is for the negative electrode will be explained. The current collector foil 41 may be, for example, a copper foil. The negative electrode active material that forms the electrode mixture layer 42 may be, for example, carbon such as graphite, metallic lithium, lithium alloy, transition metal oxide/transition metal nitride/transition metal sulfide capable of doping/undoping lithium ions, and a combination thereof. The composition of the electrode material for the negative electrode active material layer is not particularly limited and a known composition can be applied thereto.

The electrode mixture layer 42 may include, for example, besides the aforementioned negative electrode active material, a binding agent such as styrene-butadiene copolymer (SBR) as a solid content. The electrode mixture layer 42 may further include a dispersing agent such as carboxymethylcellulose Na salt (CMC) as a solid content. Solvent that forms the electrode mixture layer 42 may be, for example, water.

<Overall Structure of Apparatus for Manufacturing Belt-Like Electrode>

Figure 3:
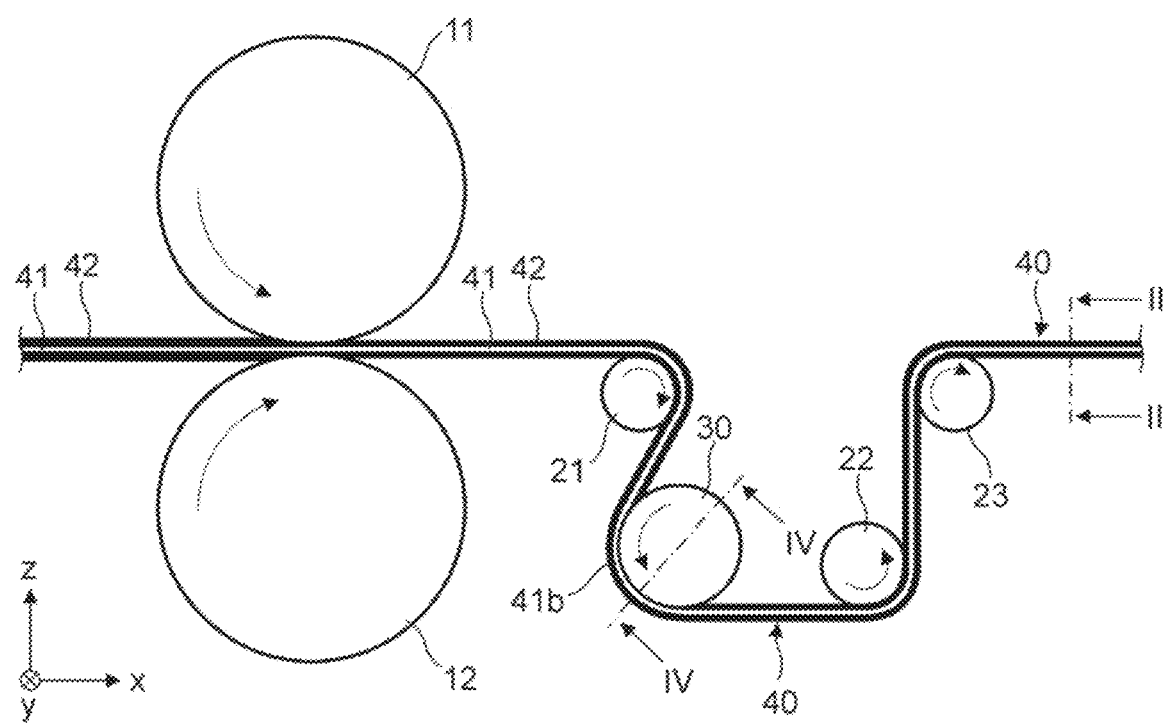
FIG. 3 is a side view of an apparatus for manufacturing a belt-like electrode according to a first embodiment.

Referring next to FIG. 3, an overall structure of an apparatus for manufacturing the belt-like electrode and a method for manufacturing the same according to the first embodiment will be explained. FIG. 3 is a side view of the apparatus for manufacturing the belt-like electrode according to the first embodiment. As shown in FIG. 3, the apparatus for manufacturing the belt-like electrode according to this embodiment includes a pair of press rolls 11 and 12, three guide rolls 21-23, and a stretching roll 30.

First, as shown in FIG. 3, the current collector foil 41 in which the electrode mixture layer 42 is formed by coating or transfer is carried into the manufacturing apparatus from the x-axis negative direction, and this current collector foil 41 is pressed by the pair of press rolls 11 and 12 in the thickness direction. As one example, the diameter of each of the press rolls 11 and 12 is about 400 mm, and a hydraulic press with a pressure capability of 30-50 t may be used. Due to this pressing process, the electrode mixture layer 42 is compressed and the electrode density of the belt-like electrode 40 to be manufactured can be improved.

As described above, FIG. 2 is a cross-sectional view taken along the line II-II of FIG. 3. FIG. 2 virtually shows, along with the cross-sectional view of the belt-like electrode 40, the press rolls 11 and 12 by alternate long and two short dashes lines. As shown in FIG. 2, when the current collector foil 41 in which the electrode mixture layer 42 is formed is pressed, the forming part 41a in the current collector foil 41 is compressed in the thickness direction (z-axis direction) and is stretched in the x-axis direction. On the other hand, since the non-forming part 41b is not compressed in the thickness direction (z-axis direction), the non-forming part 41b is not stretched in the x-axis direction. Therefore, if no measure is taken concerning this problem, the current collector foil 41 formed of the forming part 41a and the non-forming part 41b ends up being curved.

In order to solve the aforementioned problem, as shown in FIG. 3, after the current collector foil 41 in which the electrode mixture layer 42 is formed is pressed by the press rolls 11 and 12, the non-forming part 41b of the current collector foil 41 is stretched by the stretching roll 30. Therefore, the current collector foil 41 with the electrode mixture layer 42 pressed by the press rolls 11 and 12 is guided to the stretching roll 30 by the guide roll 21. The conveyance direction of the current collector foil 41 with the electrode mixture layer 42 is changed from the x-axis positive direction to the z-axis negative direction and the x-axis negative direction by the guide roll 21.

As described above, the non-forming part 41b of the current collector foil 41 is stretched by the stretching roll 30, whereby the belt-like electrode 40 is manufactured. In the example shown in FIG. 3, the conveyance direction of the belt-like electrode 40 that has passed the stretching roll 30 is changed from the x-axis positive direction to the z-axis positive direction by the guide roll 22 and is further changed from the z-axis positive direction to the x-axis positive direction by the guide roll 23.

The order of the stretching process by the stretching roll 30 and the pressing process by the press rolls 11 and 12 may be reversed. Further, as a matter of course, the number and the arrangement of the guide rolls 21-23 for changing the conveyance direction are not limited to those in the example shown in FIG. 3 and may be changed as appropriate.

<Detailed Structure of Stretching Roll 30>

Figure 4:
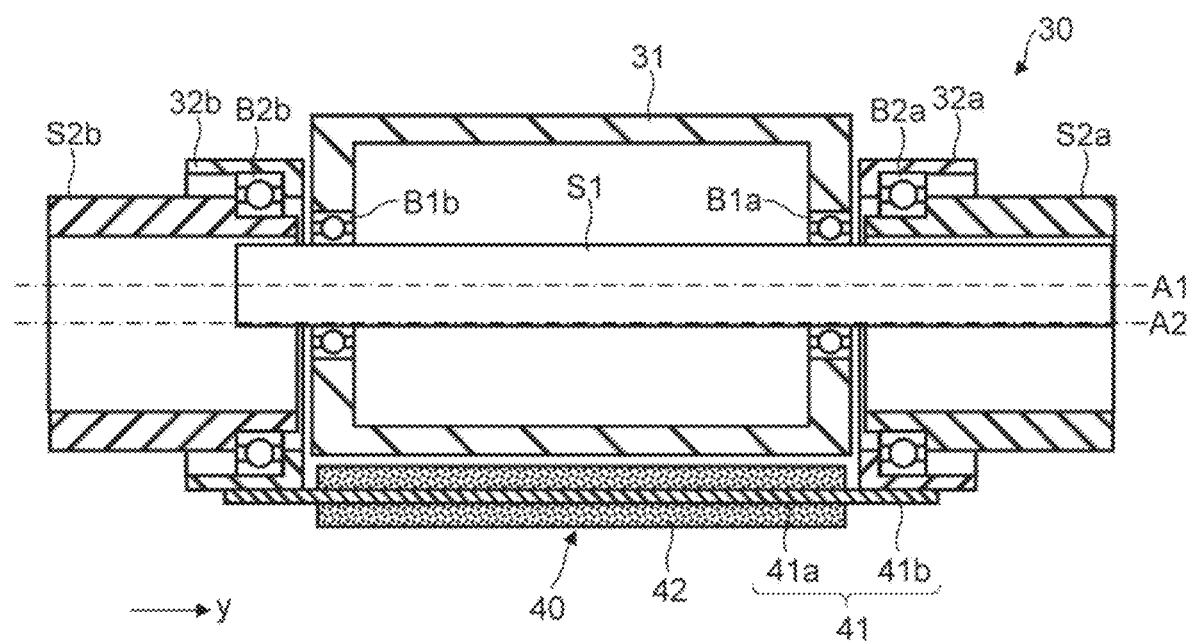
FIG. 4 is a cross-sectional view of a stretching roll 30 according to the first embodiment.
Figure 5:
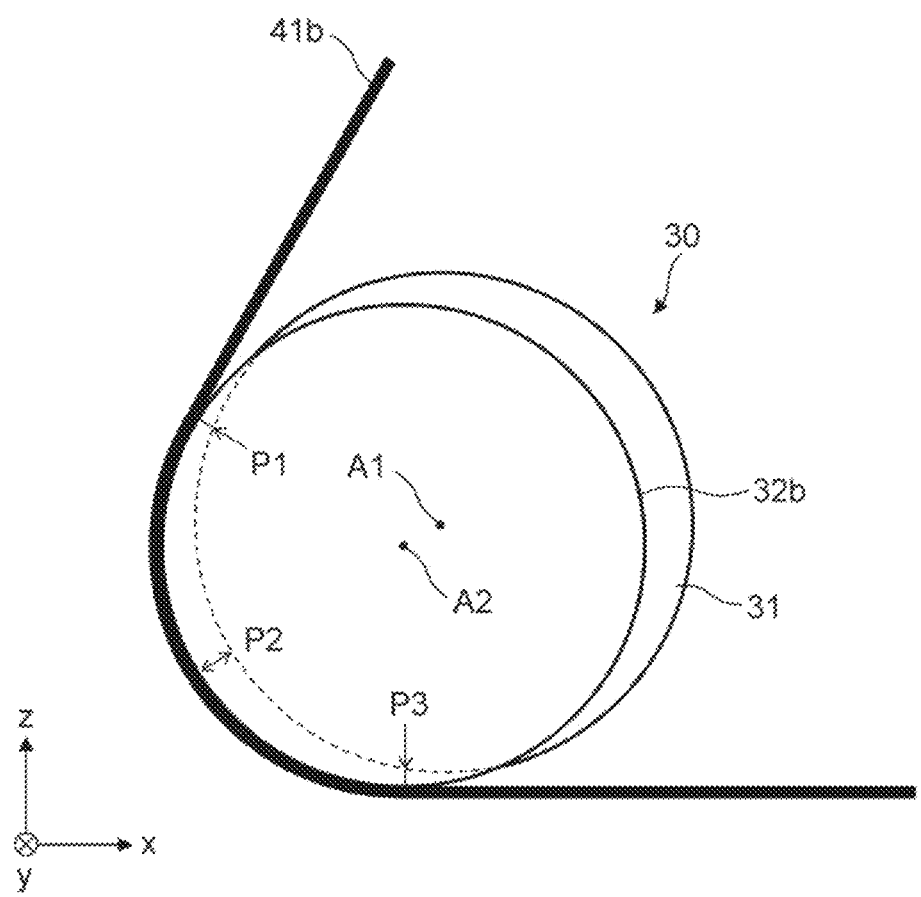
FIG. 5 is a schematic side view of the stretching roll 30 according to the first embodiment.

Referring next to FIGS. 4 and 5, a detailed structure of the stretching roll 30 according to the first embodiment will be explained. FIG. 4 is a cross-sectional view of the stretching roll 30 according to the first embodiment. FIG. 5 is a schematic side view of the stretching roll 30 according to the first embodiment. One of the characteristics of the apparatus for manufacturing the belt-like electrode according to the first embodiment lies in the structure of the stretching roll 30. As shown in FIG. 4, the stretching roll 30 includes a first roll 31 that is opposed to the electrode mixture layer 42 formed in the forming part 41a and a pair of second rolls 32a and 32b that are opposed to the non-forming part 41b.

As shown in FIG. 4, the first roll 31 has a hollow columnar shape whose longitudinal direction is the y-axis direction. By forming the first roll 31 in such a way that it has a hollow structure, the weight thereof can be reduced. However, the first roll 31 may not have a hollow structure. Bearings B1a and B1b are fitted into throughholes provided in the central part of respective bottom surfaces of the first roll 31. A shaft (first shaft) S1 extended in the y-axis direction is fit into the bearings B1a and B1b. That is, the first roll 31 can be rotated with the shaft S1 that is fixed and is not rotated as a rotation axis. FIG. 4 shows a central axis A1 of the shaft S1. When, for example, the electrode mixture layer 42 contacts the first roll 31, the first roll 31 is rotated.

As shown in FIG. 4, the pair of second rolls 32a and 32b are arranged in the respective ends of the first roll 31 in the direction of the central axis A1 (y-axis direction). As one example, the diameter of each of the second rolls 32a and 32b is substantially the same as that of the first roll 31. The pair of second rolls 32a and 32b each has a cylindrical shape whose longitudinal direction is the y-axis direction. A bearing B2a is fitted into the inner circumferential surface of the second roll 32a. A shaft S2a having a cylindrical shape extended in the y-axis direction is fit into the bearing B2a.

In a similar way, as shown in FIG. 4, a bearing B2b is fitted into the inner circumferential surface of the second roll 32b. A shaft S2b having a cylindrical shape extended in the y-axis direction is fit into the bearing B2b. That is, the second rolls 32a and 32b can be respectively rotated with the shafts (second shaft) S2a and S2b that are fixed and are not rotated as rotation axes. The shafts S2a and S2b have a common central axis A2. As shown in FIG. 4, the non-forming part 41b contacts the second rolls 32a and 32b, whereby the second rolls 32a and 32b are rotated.

As shown in the schematic side view shown in FIG. 5, at positions P1-P3 at which the non-forming part 41b contacts the second rolls 32a and 32b, a step is provided in such a way that the first roll 31 is depressed relative to the second rolls 32a and 32b. FIG. 4 is a cross-sectional view at the position P2 at which this step becomes a maximum. As shown in FIG. 4, at the position P2, this step is larger than the thickness of the electrode mixture layer 42 after the pressing process. Therefore, it is possible to cause the non-forming part 41b to contact the second rolls 32a and 32b and to stretch the non-forming part 41b with a predetermined tension.

As shown in FIGS. 4 and 5, in the stretching roll 30 according to this embodiment, the rotation axis (central axis A1) of the first roll 31 and the rotation axis (central axis A2) of the second rolls 32a and 32b are deviated from each other. As shown in FIG. 4, since the shaft S2a of at least one second roll 32a has a cylindrical shape, the shaft S1 of the first roll 31 can be inserted into the shaft S2a. According to the aforementioned simple structure, the position of the rotation axis (central axis A1) of the first roll 31 can be changed and deviated with respect to the fixed rotation axis (central axis A2) of the second rolls 32a and 32b.

As shown in FIG. 5, the central axis A1 of the first roll 31 is deviated with respect to the central axis A2 of the second rolls 32a and 32b in the direction in which the first roll 31 is away from the non-forming part 41b that is stretched. That is, the recessed step of the first roll 31 with respect to the second rolls 32a and 32b is made gradually larger from the position P1 to the position P2, and this recessed step is made gradually smaller from the position P2 to the position P3. The position P1 is a position at which the non-forming part 41b enters the second rolls 32a and 32b. The position P3 is a position at which the non-forming part 41b separates from the second rolls 32a and 32b. According to the aforementioned structure, the non-forming part 41b is gradually stretched, whereby it is possible to prevent wrinkles from occurring in the non-forming part 41b.

<Structure of Stretching Roll 300 According to Comparative Example>

Figure 6:
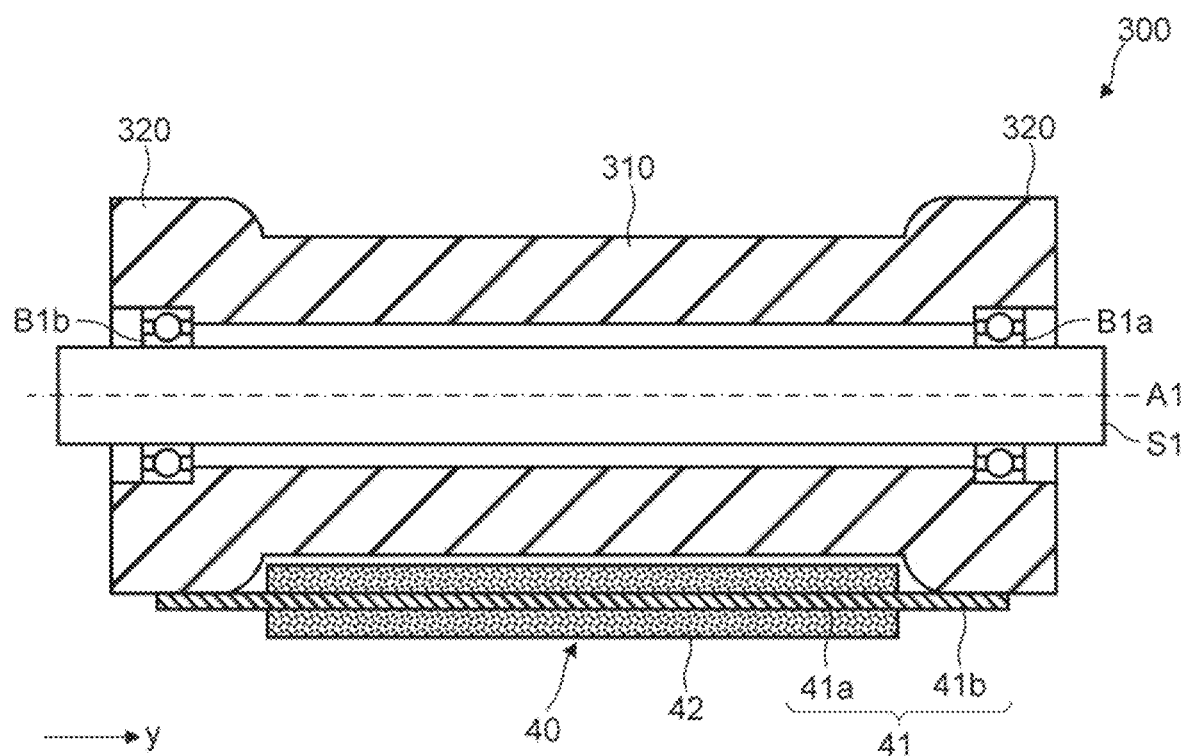
FIG. 6 is a cross-sectional view of a stretching roll 300 according to a comparative example.
Figure 7:
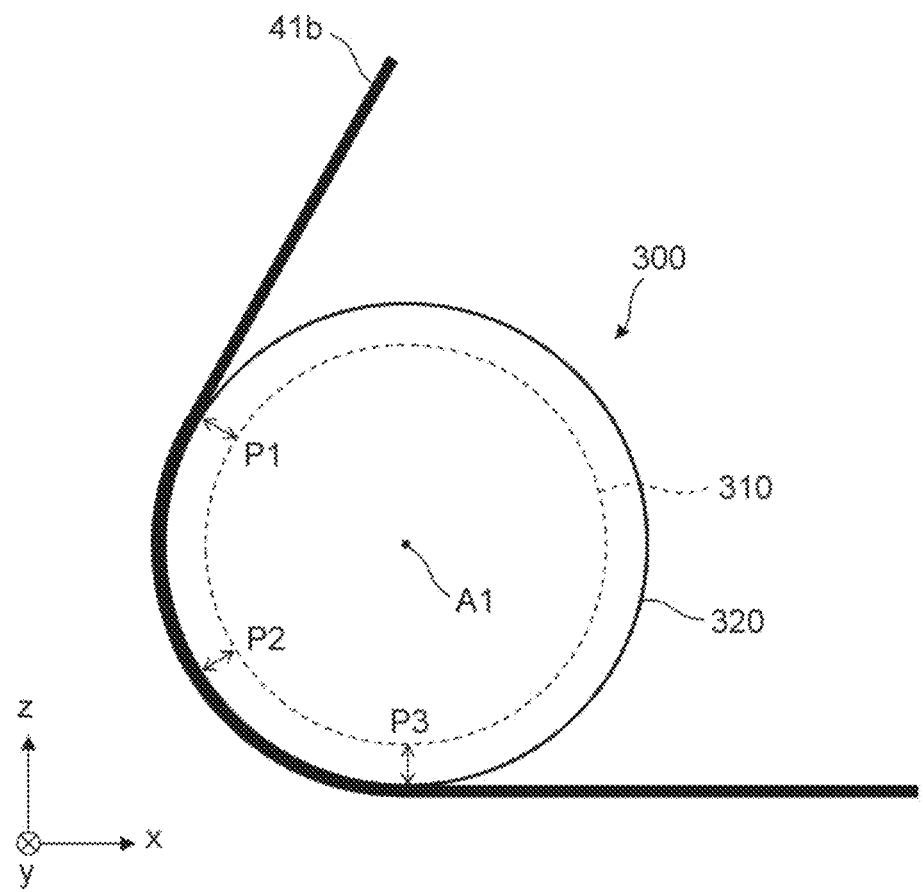
FIG. 7 is a schematic side view of the stretching roll 300 according to comparative example.

Referring next to FIGS. 6 and 7, a structure of a stretching roll 300 according to a comparative example will be explained. FIG. 6 is a cross-sectional view of the stretching roll 300 according to the comparative example. FIG. 7 is a schematic side view of the stretching roll 300 according to the comparative example. As shown in FIG. 6, in the stretching roll 300 according to the comparative example, a small-diameter part 310 that is opposed to the forming part 41a in which the electrode mixture layer 42 is formed and a pair of large-diameter parts 320 that are opposed to the non-forming part 41b are integrally formed.

As shown in FIG. 6, the stretching roll 300 has a columnar shape whose longitudinal direction is the y-axis direction. Bearings B1a and B1b are fitted into throughholes that penetrate the central part of respective bottom surfaces of the stretching roll 300 in the longitudinal direction (y-axis direction). A shaft S1 extended in the y-axis direction is fit into the bearings B1a and B1b. That is, the stretching roll 300 can be rotated with the shaft S1 as a rotation axis. FIG. 6 shows a central axis A1 of the shaft S1.

Figure 8:
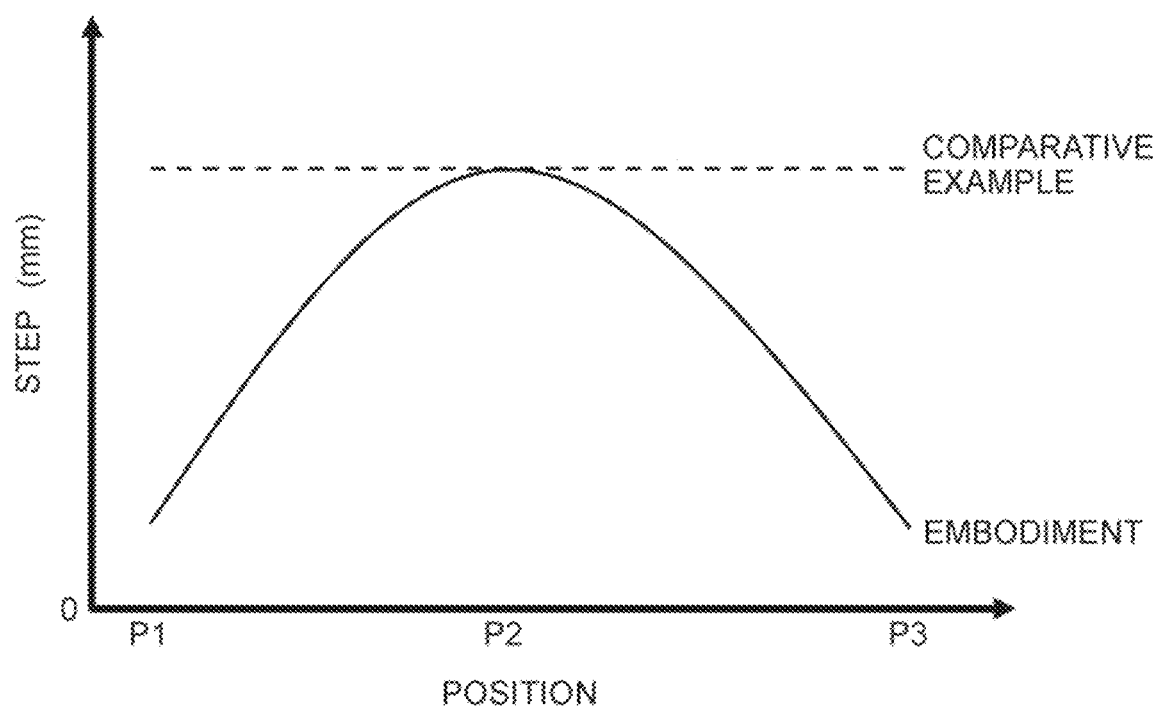
FIG. 8 is a graph showing a change in steps depending on positions in the stretching roll 30 according to the embodiment and the stretching roll 300 according to the comparative example in a comparative manner.

As shown in the schematic side view of FIG. 7, in the stretching roll 300 according to the comparative example, as a matter of course, the step between the small-diameter part 310 and the large-diameter part 320 is constant regardless of the positions P1-P3. FIG. 8 is a graph showing a change in steps depending on the positions in the stretching roll 30 according to the embodiment and the stretching roll 300 according to the comparative example in a comparative manner. The horizontal axis indicates the positions (P1-P3) in the stretching roll and the vertical axis indicates the step (mm).

Further, FIG. 6 is a cross-sectional view of the stretching roll 300 at the position P2 shown in FIG. 7. As shown in FIG. 6, the step between the small-diameter part 310 and the large-diameter part 320 becomes larger than the thickness of the electrode mixture layer 42 after the pressing process. Therefore, it is possible to cause the non-forming part 41b to contact the large-diameter part 320 and to stretch the non-forming part 41b with a predetermined tension.

As shown in FIGS. 7 and 8, in the stretching roll 300 according to the comparative example, the step between the small-diameter part 310 and the large-diameter part 320 is constant regardless of the positions in the stretching roll 300. Therefore, when the non-forming part 41b is stretched, the non-forming part 41b is instantly stretched, and wrinkles are generated in the non-forming part 41b. It is possible that the current collector foil 41 may be broken due to the wrinkles generated in the non-forming part 41b. When the press amount of the forming part 41a is increased in order to improve the electrode density, the stretch amount of the non-forming part 41b needs to be increased as well in accordance with the increase in the press amount of the forming part 41a. As discussed above, when the stretch amount of the non-forming part 41b increases, wrinkles tend to be easily generated in the non-forming part 41b.

<Effects According to Embodiment>

On the other hand, as shown in FIGS. 5 and 8, in the stretching roll 30 according to the embodiment, when the non-forming part 41b enters the second rolls 32a and 32b, the recessed step of the first roll 31 with respect to the second rolls 32a and 32b becomes gradually larger. When the non-forming part 41b separates from the second rolls 32a and 32b, this recessed step becomes gradually smaller. According to the aforementioned structure, the non-forming part 41b is gradually stretched, whereby it is possible to prevent wrinkles from occurring in the non-forming part 41b.

Figure 9:
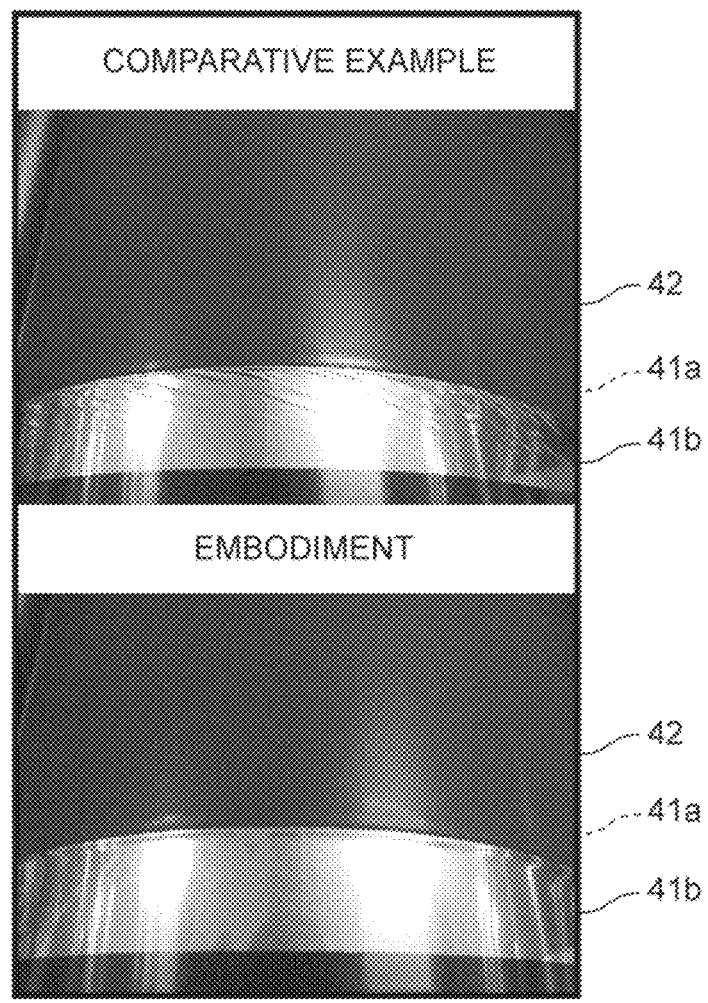
FIG. 9 are macrophotographs showing states in which wrinkles are generated when a non-forming part 41b is stretched using the stretching roll 30 according to the embodiment and the stretching roll 300 according to the comparative example.

FIG. 9 are macrophotographs showing states in which the wrinkles are generated when the non-forming part 41b is stretched using the stretching roll 30 according to the embodiment and the stretching roll 300 according to the comparative example. As shown in FIG. 9, when the stretching roll 300 according to the comparative example is used, wrinkles are generated in the vicinity of the boundary between the non-forming part 41b and the forming part 41a. The electrode mixture layer 42 is formed in the forming part 41a.

On the other hand, when the stretching roll 30 according to the embodiment is used, wrinkles generated in the non-forming part 41b are clearly reduced. Specifically, in this embodiment, compared to the comparative example, wrinkles in a range of 0.3 mm from the boundary with the forming part 41a are reduced by 90% or more. The whole width of the forming part 41a was 13.4 mm.

From the disclosure thus described, it will be obvious that the embodiment of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An apparatus for manufacturing an electrode belt comprising:

a pair of press rolls configured to press a belt-shaped current collector foil in which an electrode mixture layer is formed along a longitudinal direction in a thickness direction of the electrode mixture layer; and a stretching roll configured to stretch a non-forming part in which the electrode mixture layer is not formed and the current collector foil is exposed in respective ends of the current collector foil in a width direction, wherein the stretching roll comprises:

a first roll that is opposed to the electrode mixture layer formed in the current collector foil; and a pair of second rolls arranged in respective ends of the first roll in an axial direction, the pair of second rolls being opposed to the non-forming part, and a central axis of the first roll is deviated with respect to a central axis of the pair of second rolls in a direction away from the current collector foil that is stretched.

2. The apparatus for manufacturing the electrode belt according to claim 1, wherein the stretching roll further comprises:

a first shaft that forms a rotation axis of the first roll; and a pair of second shafts that form the rotation axis of the pair of second rolls, and at least one of the pair of second shafts has a cylindrical shape and the first shaft is inserted into the one of the pair of second shafts.

3. The apparatus for manufacturing the electrode belt according to claim 1, wherein the first roll has a hollow structure.

* * * * *